United States Patent [19]
Chang

[11] Patent Number: 5,721,844
[45] Date of Patent: Feb. 24, 1998

[54] MULTIFUNCTIONAL DATA SWITCH

[76] Inventor: Chia-Chi Chang, No. 3, Min-Ho Lane, Min Sheng Li Yuan-Lin Town, Chang-Hua Hsien, Taiwan

[21] Appl. No.: 549,911

[22] Filed: Oct. 30, 1995

[51] Int. Cl.[6] ................................................ H04B 3/38
[52] U.S. Cl. ..................... 395/311; 370/357; 340/827
[58] Field of Search ..................... 395/200.15, 200.02, 395/311; 370/357; 340/827, 825.03, 825.04; 307/125

[56]  References Cited

U.S. PATENT DOCUMENTS

| | | | |
|---|---|---|---|
| 4,271,403 | 6/1981 | Severson et al. | 340/825.04 |
| 5,247,623 | 9/1993 | Sun . | |
| 5,276,443 | 1/1994 | Gates et al. | 340/825.03 |
| 5,321,393 | 6/1994 | Carlton et al. | 340/825.03 |
| 5,530,951 | 6/1996 | Argintar . | |
| 5,594,672 | 1/1997 | Hicks | 307/125 |

OTHER PUBLICATIONS

Black Box; Schematic for ABC-25 Data Switch; Aug. 21 1989; Sold as SW025A.

*Primary Examiner*—Larry D. Donaghue
*Assistant Examiner*—Mark H. Rinehart
*Attorney, Agent, or Firm*—Merchant Gould Smith Edell Welter & Schmidt

[57]  ABSTRACT

A multifunctional data switch including a switch, a first computer connector connected to a first computer, a second computer connector connected to a second computer, and a printer connector connected to a printer, wherein the switch can be controlled to connect the first computer connector or the second computer connector to the printer connector for permitting the first computer or the second computer to use the printer, or to connect the first computer connector to the second computer connector for data transmission between the first computer and the second computer.

1 Claim, 4 Drawing Sheets

MULTIFUNCTIONAL DATA SWITCH

BACKGROUND OF THE INVENTION

The present invention relates to data switches, and relates more particularly to such a data switch which allows two computers to use one printer, or permits the computers to transmit data therebetween.

When two or more computers are installed to use a common peripheral equipment such as, for example, a printer, a data switch shall be used. However, regular data switches for this purpose do not allow the computers to communicate with one another. If two computers are connected to a computer peripheral equipment by a data switch, an external cable shall be used and connected between the computers so that the computers can transmit data with each other.

SUMMARY OF THE INVENTION

It is one of the present invention to provide a data switch which allows two computers to use a common printer, and permits the computers to transmit data with each other. It is another object of the present invention to provide a data switch which is simple in structure and inexpensive to manufacture. According to the present invention, the data switch comprises a switch, a first computer connector connected to a first computer, a second computer connector connected to a second computer, and a printer connector connected to a printer, wherein the switch can be controlled to connect the first computer connector or the second computer connector to the printer connector for permitting the first computer or the second computer to use the printer, or to connect the first computer connector to the second computer connector for data transmission between the first computer and the second computer.

DETAILED DESCRIPTION OF THE PREFERRED EMBODIMENT

Figure 1:
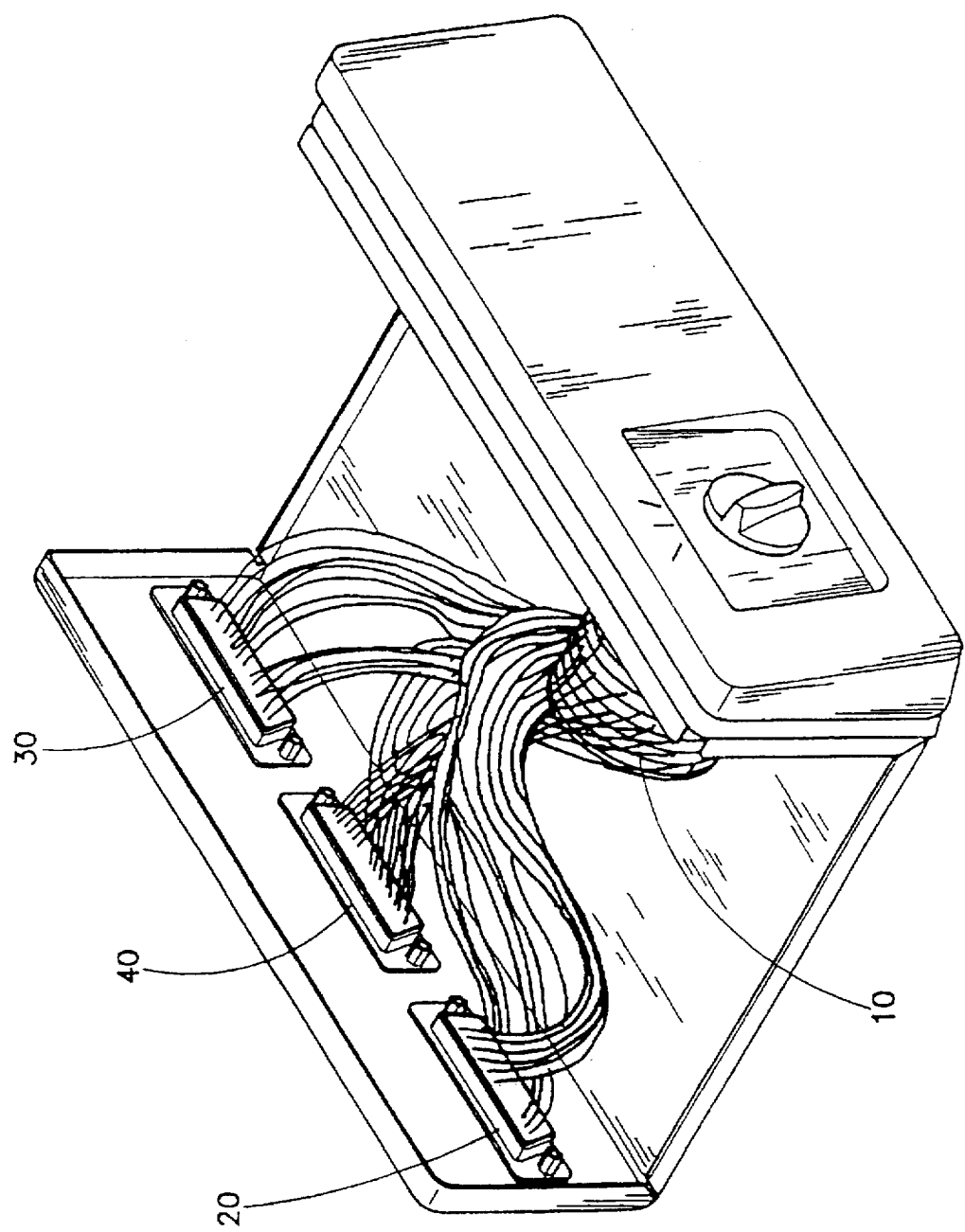
FIG. 1 shows a data switch according to the present invention.

Referring to FIG. 1, the multifunctional data switch is generally comprised of a switch 10, a first computer connector 20 for the connection of a first computer, a second computer connector 30 for the connection of a second computer, and a printer connector 40 for the connection of a printer. The switch 10 can be controlled to connect the first computer connector 20 (the first computer) or the second computer connector 30 (the second computer) to the printer connector 40 (the printer), or to connect the first computer connector 20 (the first computer) to the second computer connector 30 (the second computer).

Figure 2:
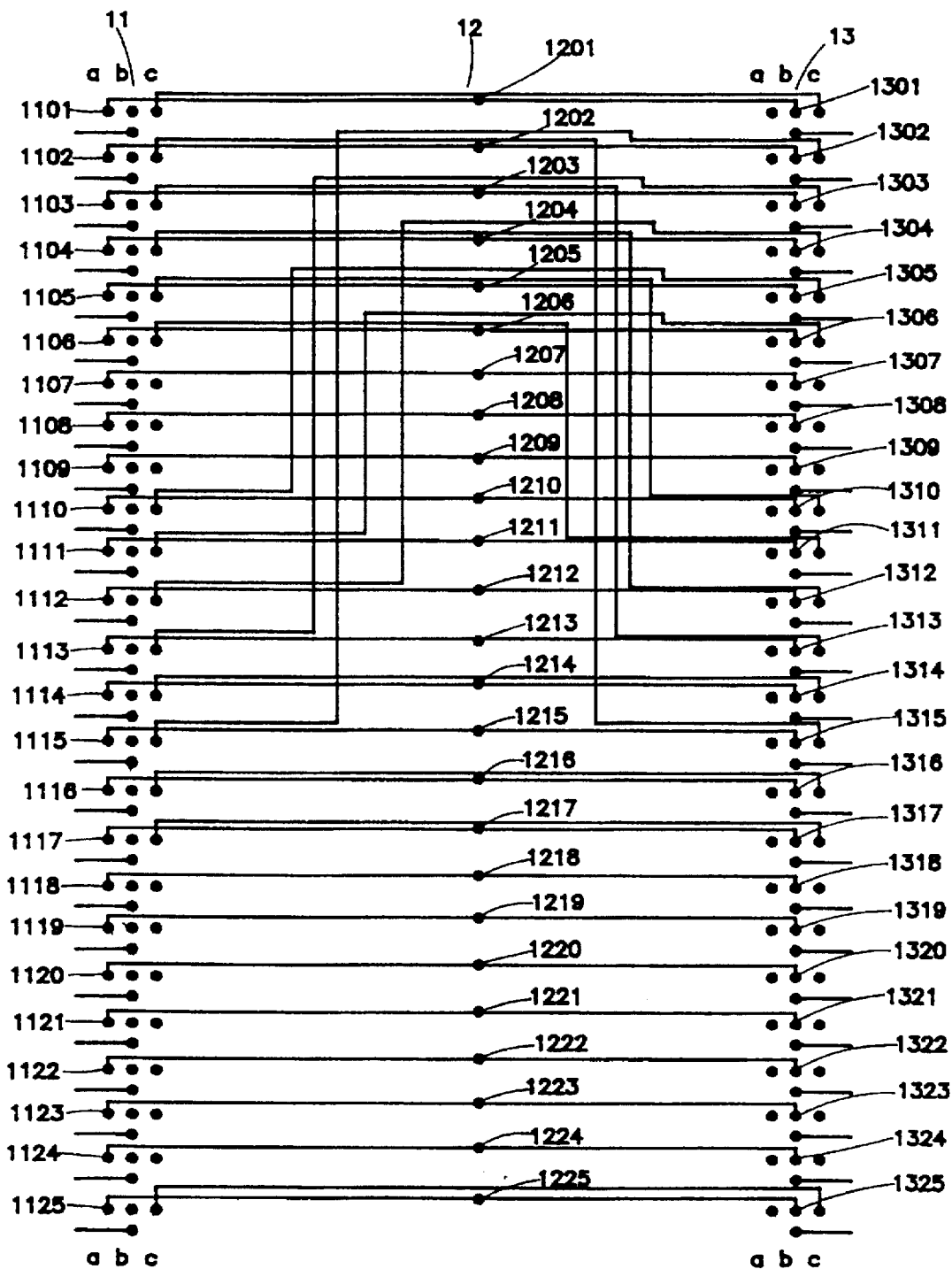
FIG. 2 is a circuit layout, showing the data switch switched to the first mode.

Referring to FIG. 2, the contact "a" of the second contact pin 1102 of the A junction 11 of the switch 10 is connected to the second contact pin 1202 of the P junction 12 and then connected to the contact "b" of the second contact pin 1302 of the B junction 13, and the contact "c" of the second contact pin 1102 of the A junction 11 is connected to the contact "c" of the fifth contact pin 1315 of the B junction 13; the contact "a" of the third contact pin 1103 of the A junction 11 is connected to the third contact pin 1203 of the P junction 12 and then connected to the contact "b" of the third contact pin 1303 of the B junction 13, and the contact "c" of the third contact pin 1103 of the A junction 11 is connected to the contact "c" of the 13th contact pin 1313 of the B junction 13; the contact "a" of the fourth contact pin 1104 of the A junction 11 of the switch 10 is connected to the fourth contact pin 1204 of the P junction 12 and then connected to the contact "b" of the fourth contact pin 1304 of the B junction 13, and the contact "c" of the fourth contact pin 1104 of the A junction 11 is connected to the contact "c" of the 12th contact pin 1312 of the B junction 13; the contact "a" of the 5th contact pin 1105 of the A junction 11 of the switch 10 is connected to the 5th contact pin 1205 of the P junction 12 and then connected to the contact "b" of the 5th contact pin 1305 of the B junction 13, and the contact "c" of the 5th contact pin 1105 of the A junction 11 is connected to the contact "c" of the 10th contact pin 1310 of the B junction 13; the contact "a" of the 6th contact pin 1106 of the A junction 11 of the switch 10 is connected to the 6th contact pin 1206 of the P junction 12 and then connected to the contact "b" of the 6th contact pin 1306 of the B junction 13, and the contact "c" of the 6th contact pin 1106 of the A junction 11 is connected to the contact "c" of the 11th contact pin 1311 of the B junction 13; the contact "a" of the 7th contact pin 1107 of the A junction 11 of the switch 10 is connected to the 7th contact pin 1207 of the P junction 12 and then connected to the 7th contact pin 1307 of the B junction 13; the contact "a" of the 8th contact pin 1108 of the A junction 11 of the switch 10 is connected to the 8th contact pin 1208 of the P junction 12 and then connected to the contact "b" of the 8th contact pin 1308 of the B junction 13; the contact "a" of the 9th contact pin 1109 of the A junction 11 of the switch is connected to the 9th contact pin 1209 of the P junction 12 and then connected to the contact "b" of the 9th contact pin 1309 of the B junction 13; the contact "a" of the 10th contact pin 1110 of the A junction 11 of the switch 10 is connected to the 10th contact pin 1210 of the P junction 12 and then connected to the contact "b" of the 10th contact pin 1310 of the B junction 13, and the contact "c" of the 10th contact pin 1110 of the A junction 11 is connected to the contact "c" of the 5th contact pin 1305 of the B junction 13; the contact "a" of the 11th contact pin 1111 of the A junction 11 of the switch 10 is connected to the 11th contact pin 1211 of the P junction 12 and then connected to the contact "b" of the 11th contact pin 1311 of the B junction 13, and the contact "c" of the 11th contact pin 1111 of the A junction 11 is connected to the contact "c" of the 6th contact pin 1306 of the B junction 13; the contact "a" of the 12th contact pin 1112 of the A junction 11 of the switch 10 is connected to the 12th contact pin 1212 of the P junction 12 and then connected to the contact "b" of the 12th contact pin 1312 of the B junction 13, and the contact "c" of the 12th contact pin 1112 of the A junction 11 is connected to the contact "c" of the 4th contact pin 1304 of the B junction 13; the contact "a" of the 13th contact pin 1113 of the A junction 11 of the switch 10 is connected to the 13th contact pin 1213 of the P junction 12 and then connected to the contact "b" of the 13th contact pin 1313 of the B junction, and the contact "c" of the 13th contact pin 1113 of the A junction 11 is connected to the contact "c" of the 3rd contact pin 1303 of the B junction 13; the contact "a" of the 14th contact pin 1114 of the A junction 11 of the switch 10 is connected to the 14th contact pin 1114 of the P junction 12 and then connected to the contact "b" of the 14th contact pin 1314 of the B junction, and the contact "c" of the 14th contact pin 1114 of the A junction 11 is connected to the contact "c" of the 14th contact pin 1314 of the B junction; the contact "a" of the 15th contact pin 1115 of the A junction 11 of the switch 10 is connected to the 15th contact pin 1215 of the P junction 12 and then connected to the contact "b" of the 15th contact pin 1315 of the B junction 13, and the contact "c" of the 15th contact pin 1115 of the A junction 11 is connected to the contact "c" of the second contact pin 1302 of the B junction 13; the contact "a" of the 16th contact pin 1116 of the A junction 11 is connected to the 16th contact pin 1216 of the P junction 12 and then connected to the contact "b" of the 16th contact pin 1316 of the B junction, and the contact "c" of the 16th contact pin 1116 of the A junction 11 is connected to the contact "c" of the 16th contact pin 1316 of the B junction 13; the contact "a" of the 17th contact pin 1117 of the A junction 11 of the switch 10 is connected to the 17th contact pin 1217 of the P junction 12 and then connected to the contact "b" of the 17th contact pin 1317 of the B junction 13, and the contact "c" of the 17th contact pin 1117 of the A junction 11 is connected to the contact "c" of the 17th contact pin 1317 of the B junction 13; the contact "a" of the 18th contact pin 1118 of the A junction 11 of the switch 10 is connected to the 18th contact pin 1218 of the P junction 18 and then connected to the contact "b" of the 18th contact pin 1318 of the B junction 13; the contact "a" of the 19th contact pin 1119 of the A junction 11 of the switch 10 is connected to the 19th contact pin 1219 of the P junction 12 and then connected to the contact "b" of the 19th contact pin 1319 of the B junction 13; the contact "a" of the 20th contact pin 1120 of the A junction 11 of the switch 10 is connected to the 20th contact 1220 of the P junction 12 and then connected to the contact "b" of the 20th contact pin 1320 of the B junction 13; the contact "a" of the 21st contact pin 1121 of the A junction 11 of the switch 10 is connected to the 21st contact pin 1221 of the P junction 12 and then connected to the contact "b" of the 21st contact pin 1321 of the B junction 13; the contact "a" of the 22nd contact pin 1122 of the A junction 11 of the switch 10 is connected to the 22nd contact pin 1222 of the P junction 12 and then connected to the contact "b" of the 22nd contact pin 1322 of the B junction 13; the contact "a" of the 23rd contact pin 1123 of the A junction 11 of the switch 10 is connected to the 23rd contact pin 1223 of the P junction 12 and then connected to the contact "b" of the 23rd contact pin 1323 of the B junction 13; the contact "a" of the 24th contact pin 1124 of the A junction 11 of the switch 10 is connected to the 24th contact pin 1224 of the P junction 12 and then connected to the contact "b" of the 24th contact pin 1324 of the B junction 13; the contact "a" of the 25th contact pin 1125 of the A junction 11 of the switch 10 is connected to the 25th contact pin 1225 of the P junction 12 and then connected to the contact "b" of the 25th contact pin 1325 of the B junction 13, and the contact "b" of the 25th contact pin 1125 of the A junction 11 is connected to the contact "c" of the 25th contact pin 1325 of the B junction 13.

Referring to FIGS. 1 and 2 again, when the switch 10 is switched to contact "a", the contact pins of the first computer connector 20 are respectively connected to the contact pins of the printer connector 40, and therefore the first computer is allowed to use the printer.

Figure 3:
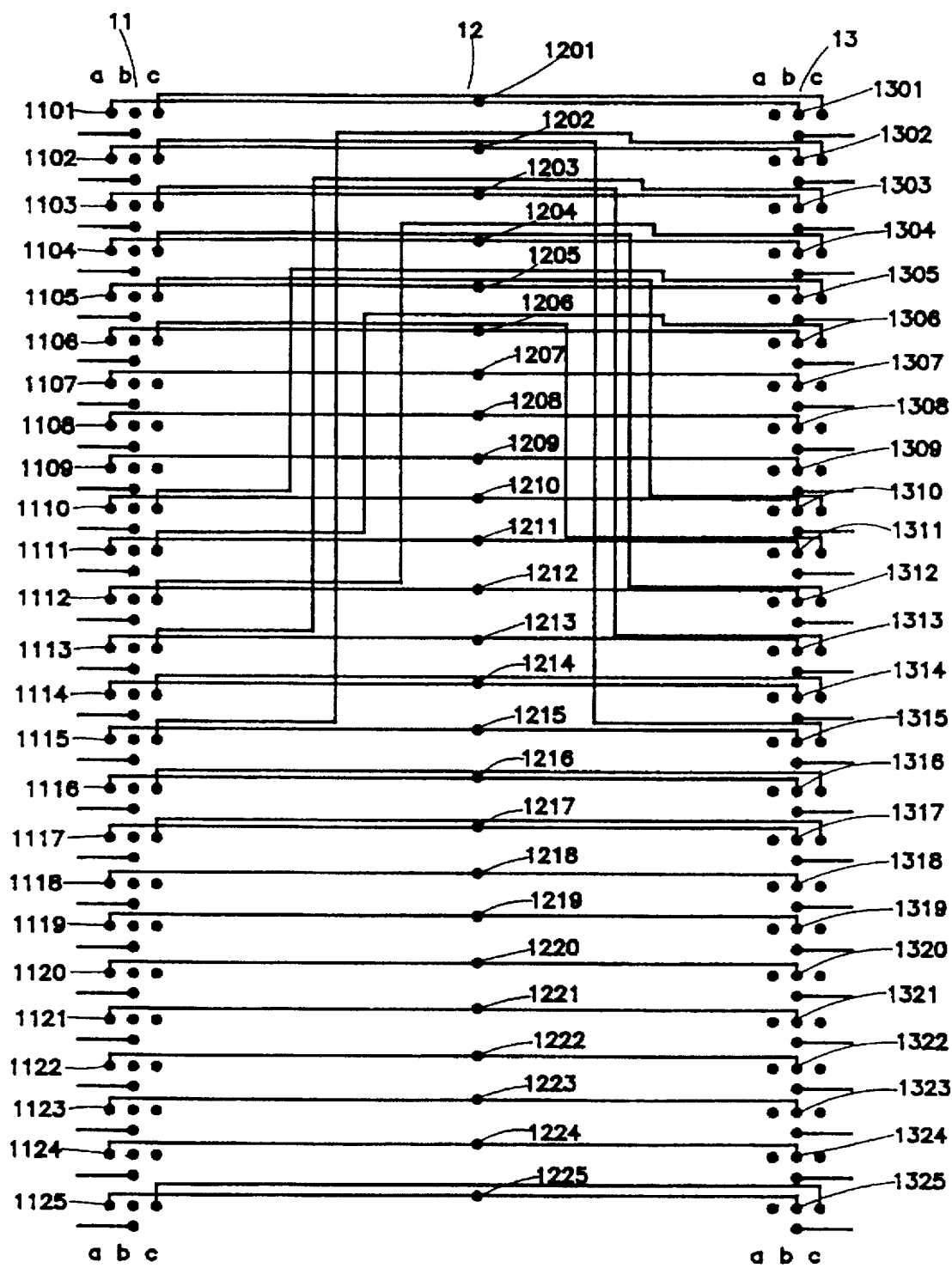
FIG. 3 is similar to FIG. 2 but showing the data switch switched to the second mode.
Figure 4:
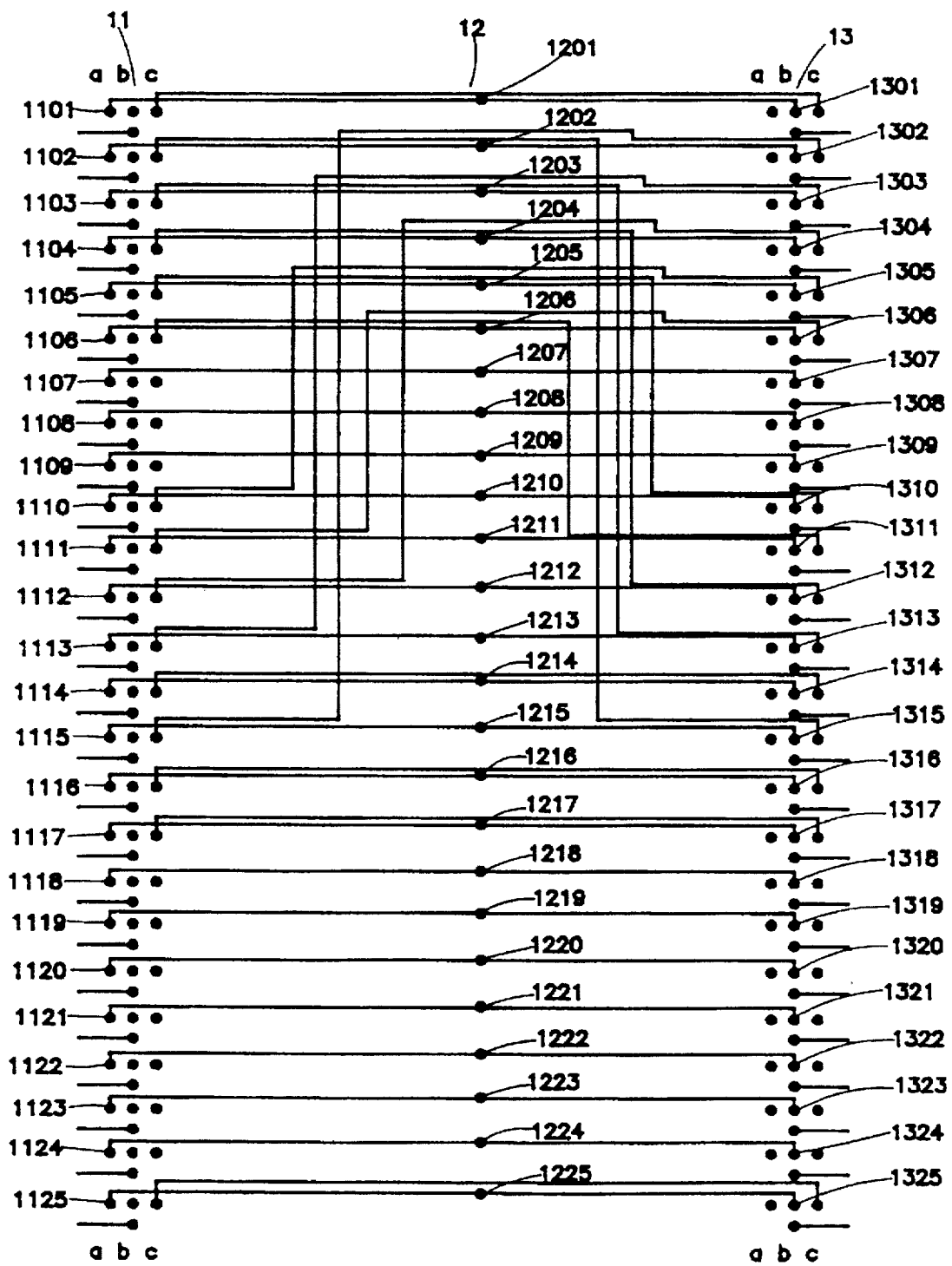
FIG. 4 is similar to FIG. 2 but showing the data switch switched to the third mode.

Referring to FIG. 3 and FIG. 1 again, when the switch 10 is switched to contact "b", the contact pins of the second computer connector 30 are respectively connected to the contact pins of the printer connector 40, and therefore the second computer is allowed to use the printer;

Referring to FIG. 4 and FIG. 1 again, when the switch 10 is switched to contact "c", the contact pins of the first computer connector 20 are respectively connected to the contact pins of the second computer connector 30, and therefore the first computer and the second computer are allowed to interchange data.

I claim:

1. A multifunctional data switch comprising a first computer connector connected to a first computer, a second computer connector connected to a second computer, a printer connector connected to a printer, and a switch controlled to connect said first computer connector or said second computer connector to said printer connector for permitting said first computer or said second computer to use said printer, or to connect said first computer connector to said second computer connector for permitting said first computer and said second computer to communicate with each other, wherein the contact "a" of the second contact pin of the A junction of the switch is connected to the second contact pin of the P junction and then connected to the contact "b" of the second contact pin of the B junction, and the contact "c" of the second contact pin of the A junction is connected to the contact "c" of the fifth contact pin of the B junction; the contact "a" of the third contact pin of the A junction is connected to the third contact pin of the P junction and then connected to the contact "b" of the third contact pin of the B junction, and the contact "c" of the third contact pin of the A junction is connected to the contact "c" of the 13th contact pin of the B junction; the contact "a" of the fourth contact pin of the A junction of the switch is connected to the fourth contact pin of the P junction and then connected to the contact "b" of the fourth contact pin of the B junction, and the contact "c" of the fourth contact pin of the A junction is connected to the contact "c" of the 12th contact pin of the junction; the contact "a" of the 5th contact pin of the A junction of the switch is connected to the 5th contact pin of the P junction and then connected to the contact "b" of the 5th contact pin of the B junction, and the contact "c" of the 5th contact pin of the A junction is connected to the contact "c" of the 10th contact pin of the B junction; the contact "a" of the 6th contact pin of the A junction of the switch is connected to the 6th contact pin of the P junction and then connected to the contact "b" of the 6th contact pin of the B junction, and the contact "c" of the 6th contact pin of the A junction is connected to the contact "c" of the 11th contact pin of the B junction; the contact "a" of the 7th contact pin of the A junction of the switch is connected to the 7th contact pin of the P junction and then connected to the 7th contact pin of the B junction; the contact "a" of the 8th contact pin of the A junction of the switch is connected to the 8th contact pin of the P junction and then connected to the contact "b" of the 8th contact pin of the B junction; the contact "a" of the 9th contact pin of the A junction of the switch is connected to the 9th contact pin of the P junction and then connected to the contact "b" of the 9th contact pin of the B junction; the contact "a" of the 10th contact pin of the A junction of the switch is connected to the 10th contact pin of the P junction and then connected to the contact "b" of the 10th contact pin of the B junction, and the contact "c" of the 10th contact pin of the A junction is connected to the contact "c" of the 5th contact pin of the B junction; the contact "a" of the 11th contact pin of the A junction of the switch is connected to the 11th contact pin of the P junction and then connected to the contact "b" of the 11th contact pin of the B junction, and the contact "c" of the 11th contact pin of the A junction is connected to the contact "c" of the 6th contact pin of the B junction; the contact "a" of the 12th contact pin of the A junction of the switch is connected to the 12th contact pin of the P junction and then connected to the contact "b" of the 12th contact pin of the B junction, and the contact "c" of the 12th contact pin of the A junction is connected to the contact "c" of the 4th contact pin of the B junction; the contact "a" of the 13th contact pin of the A junction of the switch is connected to the 13th contact pin of the P junction and then connected to the contact "b" of the 13th contact pin of the B junction, and the contact "c" of the 13th contact pin of the A junction is connected to the contact "c" of the 3rd contact pin of the B junction; the contact "a" of the 14th contact pin of the A junction of the switch is connected to the 14th contact pin of the P junction and then connected to the contact "b" of the 14th contact pin of the B junction, and the contact "c" of the 14th contact pin of the A junction is connected to the contact "c" of the 14th contact pin of the B junction; the contact "a" of the 15th contact pin of the A junction of the switch 10 is connected to the 15th contact pin of the P junction and then connected to the contact "b" of the 15th contact pin of the B junction, and the contact "c" of the 15th contact pin of the A junction is connected to the contact "c" of the second contact pin of the B junction; the contact "a" of the 16th contact pin of the A junction is connected to the 16th contact pin of the P junction and then connected to the contact "b" of the 16th contact pin of the B junction, and the contact "c" of the 16th contact pin of the A junction is connected to the contact "c" of the 16th contact pin of the B junction; the contact "a" of the 17th contact pin of the A junction of the switch is connected to the 17th contact pin of the P junction and then connected to the contact "b" of the 17th contact pin of the B junction, and the contact "c" of the 17th contact pin of the A junction is connected to the contact "c" of the 17th contact pin of the B junction; the contact "a" of the 18th contact pin of the A junction of the switch is connected to the 18th contact pin of the P junction and then connected to the contact "b" of the 18th contact pin of the B junction; the contact "a" of the 19th contact pin of the A junction of the switch is connected to the 19th contact pin of the P junction and then connected to the contact "b" of the 19th contact pin of the B junction; the contact "a" of the 20th contact pin of the A junction of the switch is connected to the 20th contact of the P junction and then connected to the contact "b" of the 20th contact pin of the B junction; the contact "a" of the 21st contact pin of the A junction of the switch is connected to the 21st contact pin of the P junction and then connected to the contact "b" of the 21st contact pin of the B junction; the contact "a" of the 22nd contact pin of the A junction of the switch is connected to the 22nd contact pin of the P junction and then connected to the contact "b" of the 22nd contact pin of the B junction; the contact "a" of the 23rd contact pin of the A junction of the switch is connected to the 23rd contact pin of the P junction and then connected to the contact "b" of the 23rd contact pin of the B junction; the contact "a" of the 24th contact pin of the A junction of the switch is connected to the 24th contact pin of the P junction and then connected to the contact "b" of the 24th contact pin of the B junction; the contact "a" of the 25th contact pin of the A junction of the switch is connected to the 25th contact pin of the P junction and then connected to the contact "b" of the 25th contact pin of the B junction, and the contact "b" of the 25th contact pin of the A junction is connected to the contact "c" of the 25th contact pin of the B junction.

* * * * *